(12) United States Patent
Mohammed et al.

(10) Patent No.: US 11,976,595 B1
(45) Date of Patent: May 7, 2024

(54) GAS TURBINE ENGINE WITH AIR/OIL COOLER HAVING AN AIRFLOW CONTROL BAFFLE

(71) Applicant: Pratt & Whitney Canada Corp., Longueuil (CA)

(72) Inventors: Kashif Mohammed, Brossard (CA); John Sgouromitis, Dorval (CA); Sylvain Lamarre, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/334,009

(22) Filed: Jun. 13, 2023

(51) Int. Cl.
*F02C 7/14* (2006.01)
*F02C 7/18* (2006.01)
*F02C 9/16* (2006.01)

(52) U.S. Cl.
CPC .............. *F02C 7/14* (2013.01); *F02C 7/18* (2013.01); *F02C 9/16* (2013.01); *F05D 2260/213* (2013.01); *F05D 2270/3032* (2013.01)

(58) Field of Classification Search
CPC .............. F02C 7/14; F02C 7/18; F02C 9/16
See application file for complete search history.

(56) References Cited

U.S. PATENT DOCUMENTS

| | | | |
|---|---|---|---|
| 4,203,566 A | 5/1980 | Lord | |
| 4,254,618 A * | 3/1981 | Elovic | F02C 7/185 60/39.83 |
| 7,040,576 B2 | 5/2006 | Noiseux et al. | |
| 7,607,308 B2 * | 10/2009 | Kraft | F02C 7/32 60/785 |
| 7,886,520 B2 * | 2/2011 | Stretton | F01D 17/105 239/265.17 |
| 8,161,726 B2 * | 4/2012 | Schwarz | F02K 3/115 60/39.08 |
| 8,746,315 B2 * | 6/2014 | Barlag | B29D 99/0014 156/562 |
| 8,904,753 B2 * | 12/2014 | Murphy | F02C 7/185 165/96 |
| 9,885,313 B2 * | 2/2018 | Baltas | F02K 1/06 |
| 10,036,329 B2 * | 7/2018 | Suciu | F02K 3/04 |
| 10,563,585 B2 * | 2/2020 | Lord | F02C 6/08 |
| 10,746,100 B2 * | 8/2020 | Combes | B64D 27/12 |
| 10,794,288 B2 * | 10/2020 | Schwarz | F02K 3/06 |

(Continued)

FOREIGN PATENT DOCUMENTS

| | | | | |
|---|---|---|---|---|
| CN | 106988887 A | * | 7/2017 | ............ F01D 25/14 |
| CN | 113721328 B | * | 1/2023 | |

*Primary Examiner* — Craig Kim
(74) *Attorney, Agent, or Firm* — CANTOR COLBURN LLP (57) ABSTRACT

A gas turbine engine according to a first embodiment, having a case; a core within the case; an exhaust nozzle that is fluidly coupled to the case; a duct having a duct outlet that is fluidly coupled to the exhaust nozzle and a duct body extending from the duct outlet to a duct inlet; an air/oil cooler having an airflow outlet disposed at the duct inlet and a cooler body extending from the airflow outlet to an airflow inlet; and an airflow control baffle disposed at one of: the duct inlet; the duct outlet; and the airflow inlet of the cooler, wherein the airflow control baffle is configured to open when oil temperature in the engine is above a first threshold and close when the oil temperature is below a second threshold that is lower than the first threshold.

20 Claims, 7 Drawing Sheets

(56) References Cited

U.S. PATENT DOCUMENTS

| | | | |
|---|---|---|---|
| 11,060,462 B2* | 7/2021 | Fert | F02C 6/08 |
| 11,492,971 B2* | 11/2022 | Sodaro | F02C 7/06 |
| 11,512,639 B2* | 11/2022 | Rambo | F02C 7/14 |
| 11,549,393 B2* | 1/2023 | Cleyet | F01D 25/18 |
| 2007/0245739 A1* | 10/2007 | Stretton | F02C 6/08 |
| | | | 60/728 |
| 2015/0247462 A1* | 9/2015 | Suciu | F02C 7/18 |
| | | | 415/144 |
| 2023/0407470 A1* | 12/2023 | Spiegelman | B01D 53/14 |

* cited by examiner

GAS TURBINE ENGINE WITH AIR/OIL COOLER HAVING AN AIRFLOW CONTROL BAFFLE

BACKGROUND

Exemplary embodiments pertain to the art of oil cooling systems for gas turbine engines and more specifically to a gas turbine engine with an air/oil cooler having an airflow control baffle that controls access to a cooling airflow.

In gas turbine engines, an air/oil cooler (also referred to as a radiator) may use oil sensing thermostatic bypass valves to control the flow of cooling air. These valves sample oil within the cooler and control oil flow either through a cooling matrix or a parallel bypass channel. The valves allow or prevent cooling of oil flowing through the cooler. The valves can, over time, become unreliable. Some aircraft engine configurations use engine forced airflow as the cooling media in the cooler. However, using the engine airflow to induce cooling flow through a cooler can reduce engine efficiency.

BRIEF DESCRIPTION

Disclosed is a gas turbine engine according to a first embodiment, including: a case; a core within the case; an exhaust nozzle that is fluidly coupled to the case; a duct having a duct outlet that is fluidly coupled to the exhaust nozzle and a duct body extending from the duct outlet to a duct inlet; an air/oil cooler having an airflow outlet disposed at the duct inlet and a cooler body extending from the airflow outlet to an airflow inlet; and an airflow control baffle disposed at one of: the duct inlet; the duct outlet; and the airflow inlet of the cooler, wherein the airflow control baffle is configured to open when oil temperature in the engine is above a first threshold and close when the oil temperature is below a second threshold that is lower than the first threshold.

In addition to one or more aspects of the engine according to the first embodiment, or as an alternate, the airflow control baffle is configured to modulate between open and closed, such that it transitions between opened and closed when the temperature is between the thresholds.

In addition to one or more aspects of the engine according to the first embodiment, or as an alternate, the airflow control baffle includes a first slotted plate and a second slotted plate configured to slide against the first slotted plate, between: a first position where slots in the first and second slotted plates are aligned with each other to open the airflow control baffle; and a second position where the slots in the first and second slotted plates are offset from each other to close the airflow control baffle.

In addition to one or more aspects of the engine according to the first embodiment, the engine includes an engine controller; a temperature sensor in the engine that is operationally coupled to the engine controller; and an actuator that is operationally coupled to the engine controller and the second slotted plate of the airflow control baffle, and is configured to move the second slotted plate to open or close the airflow control baffle when the oil temperature in the engine is sensed by the temperature sensor as being above the first threshold and close when the oil temperature is sensed by the temperature sensor as being is below the second threshold that is lower than the first threshold.

In addition to one or more aspects of the engine according to the first embodiment, or as an alternate, airflow baffle is along an airflow path providing airflow to the cooler.

In addition to one or more aspects of the engine according to the first embodiment, or as an alternate, the airflow control baffle is disposed at the duct inlet or outlet.

In addition to one or more aspects of the engine according to the first embodiment, or as an alternate, the airflow control baffle is disposed at the airflow inlet of the cooler.

In addition to one or more aspects of the engine according to the first embodiment, the engine includes an inlet nozzle that is fluidly coupled to the case.

Further disclosed is a gas turbine engine according to a second embodiment, including: a case; a core within the case; an inlet nozzle that is fluidly coupled to the case; a duct having a duct inlet that is fluidly coupled to the inlet nozzle and a duct body extending from the duct inlet to a duct outlet; an air/oil cooler having an airflow inlet disposed at the duct outlet and a cooler body extending from the airflow inlet to an airflow outlet; and an airflow control baffle disposed at one of: the duct inlet; the duct outlet; and the airflow outlet of the cooler, wherein the airflow control baffle is configured to open when oil temperature in the engine is above a first threshold and close when the oil temperature is below a second threshold that is lower than the first threshold.

In addition to one or more aspects of the engine according to the second embodiment, the airflow control baffle is configured to modulate between open and closed, such that it transitions between opened and closed when the temperature is between the thresholds.

In addition to one or more aspects of the engine according to the second embodiment, the airflow control baffle includes a first slotted plate and a second slotted plate configured to slide against the first slotted plate between: a first position where slots in the first and second slotted plates are aligned with each other to open the airflow control baffle; and a second position where the slots in the first and second slotted plates are offset from each other to close the airflow control baffle.

In addition to one or more aspects of the engine according to the second embodiment, the engine includes an engine controller; a temperature sensor in the engine that is operationally coupled to the engine controller; an actuator that is operationally coupled to the engine controller and the second slotted plate of the airflow control baffle and is configured to move the second slotted plate to open or close the airflow control baffle when the oil temperature in the engine is sensed by the temperature sensor as being above the first threshold and close when the oil temperature is sensed by the temperature sensor as being is below the second threshold that is lower than the first threshold.

In addition to one or more aspects of the engine according to the second embodiment, airflow baffle is along an airflow path providing airflow to the cooler.

In addition to one or more aspects of the engine according to the second embodiment, the airflow control baffle is disposed at the duct inlet or outlet.

In addition to one or more aspects of the engine according to the second embodiment, the airflow control baffle is disposed at the airflow outlet of the cooler.

In addition to one or more aspects of the engine according to the second embodiment, the engine includes an exhaust nozzle that is fluidly coupled to the case.

Further disclosed is method according to a first embodiment of cooling engine oil in gas turbine engine, including monitoring, by an engine controller that is operationally coupled to a temperature sensor, oil temperature of the gas turbine engine while an airflow control baffle is closed, preventing airflow from passing through an air/oil cooler, a duct that is fluidly coupled to the cooler, and into an exhaust nozzle that is fluidly coupled to the duct, wherein the airflow control baffle is disposed at one of: a duct inlet; a duct outlet; and an airflow inlet of the cooler; determining, by the engine controller, that the oil temperature is above a first threshold; and controlling, by the engine controller, an actuator to open the airflow control baffle; monitoring, by the engine controller, the oil temperature in the engine while the airflow control baffle is opened; determining, by the engine controller, that the oil temperature is below a second threshold that is lower than the first threshold; and controlling, by the engine controller, the actuator to close the airflow control baffle.

In addition to one or more aspects of the method according to the first embodiment, the method includes modulating the airflow control baffle between open and closed, such that it transitions between opened and closed when the temperature is between the thresholds.

Further disclosed is method according to a second embodiment of cooling engine oil in gas turbine engine, including monitoring, by an engine controller that is operationally coupled to a temperature sensor, oil temperature in the gas turbine engine while an airflow control baffle is closed, preventing airflow from passing from an inlet nozzle, through a duct that is fluidly coupled to the inlet nozzle, and through the cooler that is fluidly coupled to the duct, wherein the airflow control baffle is disposed at one of: a duct inlet; a duct outlet; and an airflow outlet of the cooler; determining, by the engine controller, that the oil temperature is above a first threshold; and controlling, by the engine controller, an actuator to open the airflow control baffle; monitoring, by the engine controller, the oil temperature in the engine while the airflow control baffle is opened; determining, by the engine controller, that the oil temperature is below a second threshold that is lower than the first threshold; and controlling, by the engine controller, the actuator to close the airflow control baffle.

In addition to one or more aspects of the method according to the second embodiment, the method includes modulating the airflow control baffle between open and closed, such that it transitions between opened and closed when the temperature is between the thresholds.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
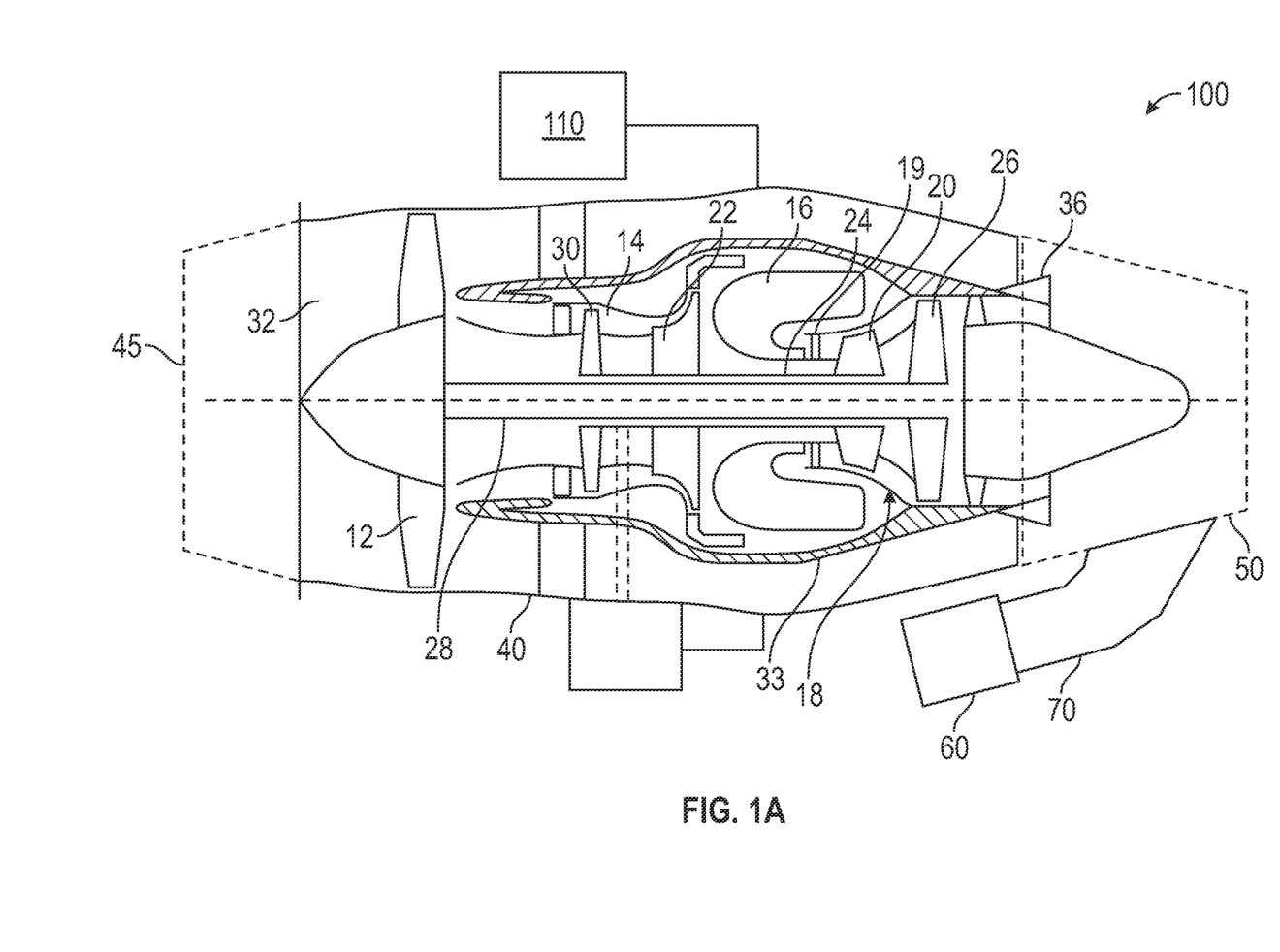
FIG. 1A shows a gas turbine engine with an air/oil cooler ducted to an exhaust nozzle of the engine.
Figure 1B:
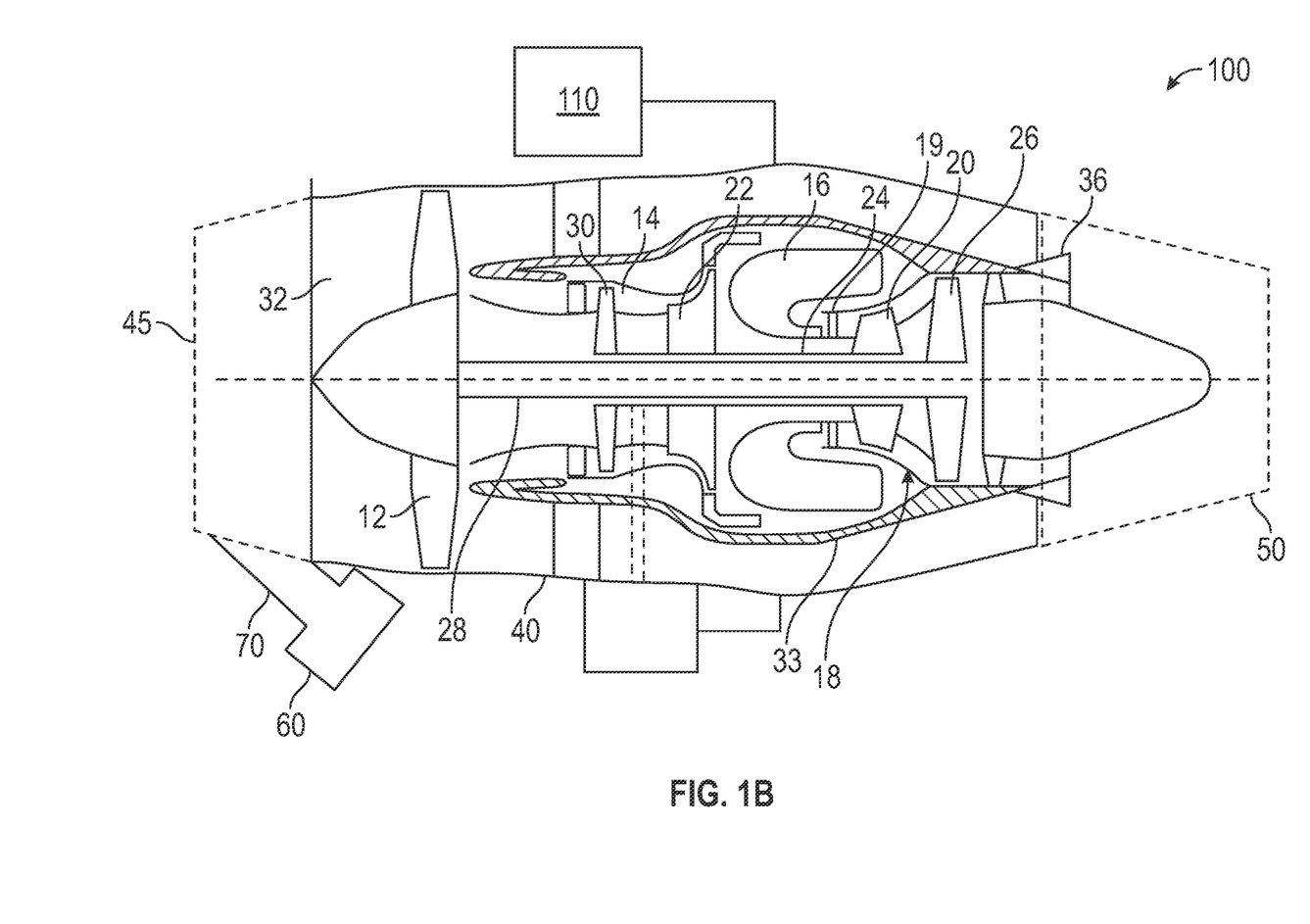
FIG. 1B shows a gas turbine engine with an air/oil cooler ducted to an inlet nozzle of the engine.

FIGS. 1A and 1B illustrate a gas turbine engine 100 of a type provided for use in subsonic flight, generally including, in serial flow communication, a fan 12 through which ambient air is propelled toward an inlet 32, and a core 33 including a compressor section 14 for pressurizing the air, a combustor 16 in which the compressed air is mixed with fuel and ignited for generating an annular stream of hot combustion gases, and a turbine section 18 for extracting energy from the combustion gases, which exit via an exhaust 36. High-pressure rotor(s) of the turbine section 18 (referred to as "HP turbine rotor(s) 20") are drivingly engaged to high-pressure rotor(s) of the compressor section 14 (referred to as "HP compressor rotor(s) 22") through a high-pressure shaft 24. The turbine section 18 includes a vane 19 between the combustor 16 and the HP turbine rotor(s) 20. Low-pressure rotor(s) of the turbine section 18 (referred to as "LP turbine rotor(s) 26") are drivingly engaged to the fan rotor 12 and to low-pressure rotor(s) of the compressor section 14 (referred to as "LP compressor rotor(s) 30") through a low-pressure shaft 28 extending within the high-pressure shaft 24 and rotating independently therefrom.

Although illustrated as a turbofan engine, the gas turbine engine 100 may alternatively be another type of engine, for example a turboshaft engine, also generally including in serial flow communication a compressor section, a combustor, and a turbine section, and an output shaft through which power is transferred. A turboprop engine may also apply as well as an auxiliary power unit (APU). In addition, although the engine 100 is described herein for flight applications, it should be understood that other uses, such as industrial or the like, may apply.

Control of the operation of the engine 100 can be effected by one or more control systems, for example an engine controller 110, which is communicatively coupled to the engine 100. The engine controller 110 can modulate a fuel flow provided to the engine 100, the position and orientation of variable geometry mechanisms within the engine 100, a bleed level of the engine 100, and the like, based on predetermined schedules or algorithms. In some embodiments, the engine controller 110 includes one or more FADEC(s), electronic engine controller(s) (EEC(s)), or the like, that are programmed to control the operation of the engine 100. The operation of the engine 100 can be controlled by way of one or more actuators, mechanical linkages, hydraulic systems, and the like. The engine controller 110 can be coupled to the actuators, mechanical linkages, hydraulic systems, and the like, in any suitable fashion for effecting control of the engine 100.

As shown in FIG. 1A, and explained in greater detail below, the engine 100 may have an outer case 40 with a case inlet nozzle (for simplicity, an inlet nozzle) 45 at its forward end and a case exhaust nozzle (for simplicity, an exhaust nozzle) 50 at its aft end. An air/oil cooler (for simplicity, a cooler) 60 for cooling engine oil may be connected to the exhaust nozzle 50 via a duct 70. Alternatively, as shown in FIG. 1B, and also explained in greater detail below, the cooler 60 and duct 70 may be connected to the inlet nozzle 45. In each configuration, cooling oil is transferred from the core 33 to the cooler 60 via cooling supply and return lines (not shown).

Figure 2:
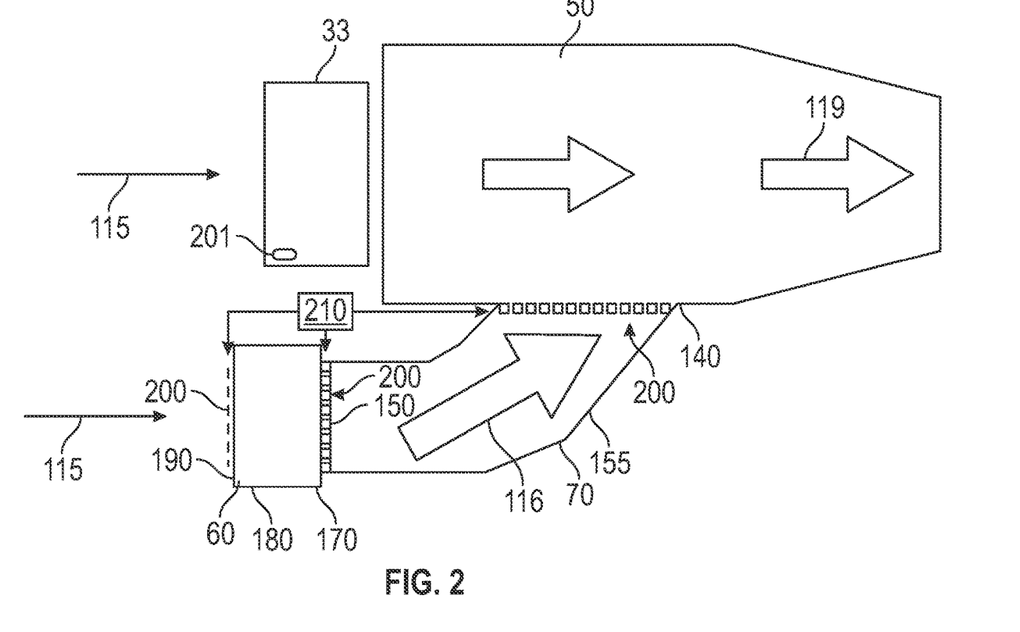
FIG. 2 shows additional aspects of the engine configuration of FIG. 1A.

FIG. 2 shows additional aspects of the engine configuration of FIG. 1A. The core 33 and exhaust nozzle 50 are shown. The core 33 is subject to an airflow 115, e.g., during flight. The duct 70 has a duct outlet 140 that is fluidly coupled to the exhaust nozzle 50 and a duct body 155 extending forward (e.g., upstream) from the duct outlet 140 to a duct inlet 150 and airflow moves therebetween. The air/oil cooler 60 that is configured to cool engine oil has an airflow outlet 170 disposed at the duct inlet 150 and a cooler body 180 extending forward from the airflow outlet 170 to an airflow inlet 190.

An airflow control baffle (for simplicity, a baffle) 200 is provided to control airflow through the cooler 60 and into the exhaust nozzle 50. The baffle 200 may include an electronically controlled actuator 210, which may be controlled by the engine controller 110. The actuator 210 controls the baffle 200 based on sensed temperature of the engine oil with a sensor 201 that is operationally coupled to the controller 110. The sensor 201 may be in the core 33, though it may be at another place in the engine where the temperature control is critical, such that the sensor 201 informs the motion of the airflow baffle 200 to increase/decrease a flow of cooling air 115 to cool the oil. That is, the actuator 210 may control the baffle 200 to allow cooling flow or prevent flow from traveling past the baffle 200. The baffle 200 may be positioned at one of several locations to prevent flow through the cooler 60 and into the exhaust nozzle 50, including the duct inlet 150, the duct outlet 140, and the airflow inlet 190 of the cooler 60. The baffle 200 is configured to open when oil temperature is above a first threshold and needs to be cooled. The baffle 200 is configured to close when the oil temperature is below a second threshold that is lower than the first threshold such that the oil does not need to be cooled. When the baffle 200 is opened, an induced airflow 116 through the duct 70, from the airflow 115 into and around the engine 100, enables cooling of oil flowing through the cooler 60.

Figure 3:
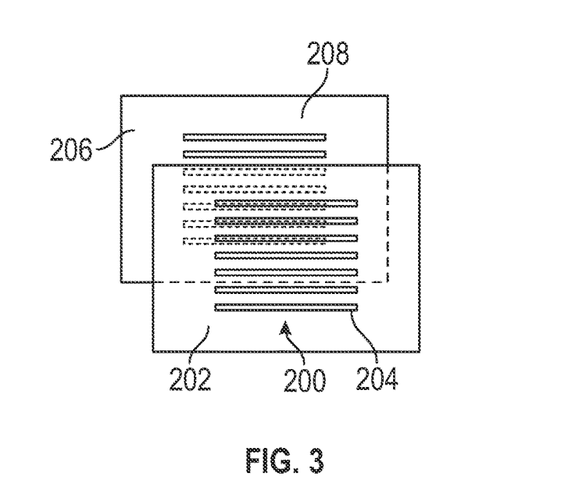
FIG. 3 shows aspects of a baffle utilized to control flow through the cooler.

As shown in FIG. 3, as a non-limiting example, the baffle 200 may be a dual plate baffle having a first slotted plate 202 with first slots 204 and a second slotted plate 206 with second slots 208. The slots 204, 208 may be the same size and shape as each other, such as rectangular or other shape. The second plate 206 may move by operation of the actuator 210 between first and second positions. In the first position (FIG. 5), the slots 204, 208 in the slotted plates 202, 206 are aligned with each other to open the baffle 200. In the second position (FIG. 6), the slots 204, 208 in the slotted plates 202, 206 are offset from each other to close the baffle 200.

With this configuration, the baffle 200 and actuator 210 replaces the function of the oil based thermostatic valve. The engine oil sensor 210 would sense whether the oil is below, at or above the predetermined operating temperature. The actuator-controlled baffle 200 could accordingly be used to control airflow through the air/oil cooler 60 to control the resulting oil temperature in the engine 100.

Figure 4:
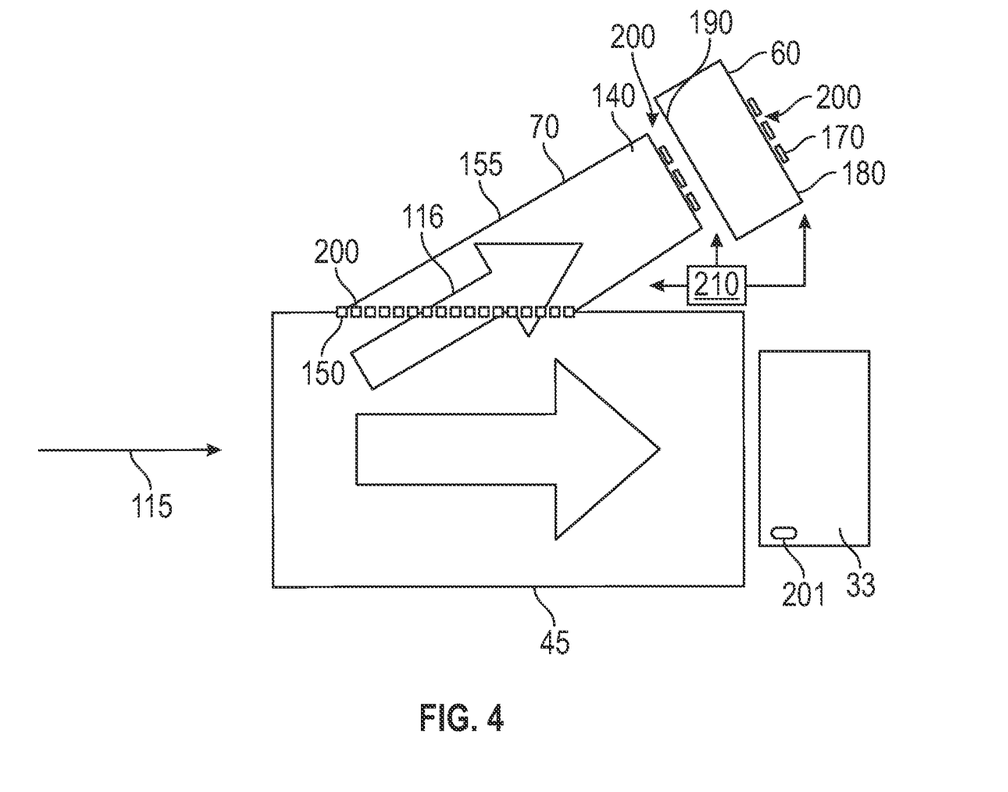
FIG. 4 shows additional aspects of the engine configuration of FIG. 1B.

FIG. 4 shows additional aspects of the engine configuration of FIG. 1B. The inlet nozzle 45 and the core 33 are shown. The inlet nozzle 45 is subject to the airflow 115. The duct 70 has the duct inlet 150 that is fluidly coupled to the inlet nozzle 45 and the duct body 155 that extends from the duct inlet 150 to the duct outlet 140 and airflow moves therebetween. The cooler 60 has the airflow inlet 190 disposed at the duct outlet 140 and the cooler body 180 extending from the airflow inlet 190 to the airflow outlet 170. The baffle 200 is disposed at one of the duct inlet 150, the duct outlet 140 and the airflow outlet 170 of the cooler 60. As with the embodiment shown in FIG. 2, the baffle 200 is configured to open when oil temperature in the engine 100, sensed by the sensor 201 in the core 33, is above the first threshold, to provide the induced airflow 116 into the duct 70 to cool oil flowing through the cooler 60. The baffle 200 is configured to close when the oil temperature is below the second threshold that is lower than the first threshold. The baffle 200 may be the same dual plate baffle shown in FIG. 3.

Figure 5:
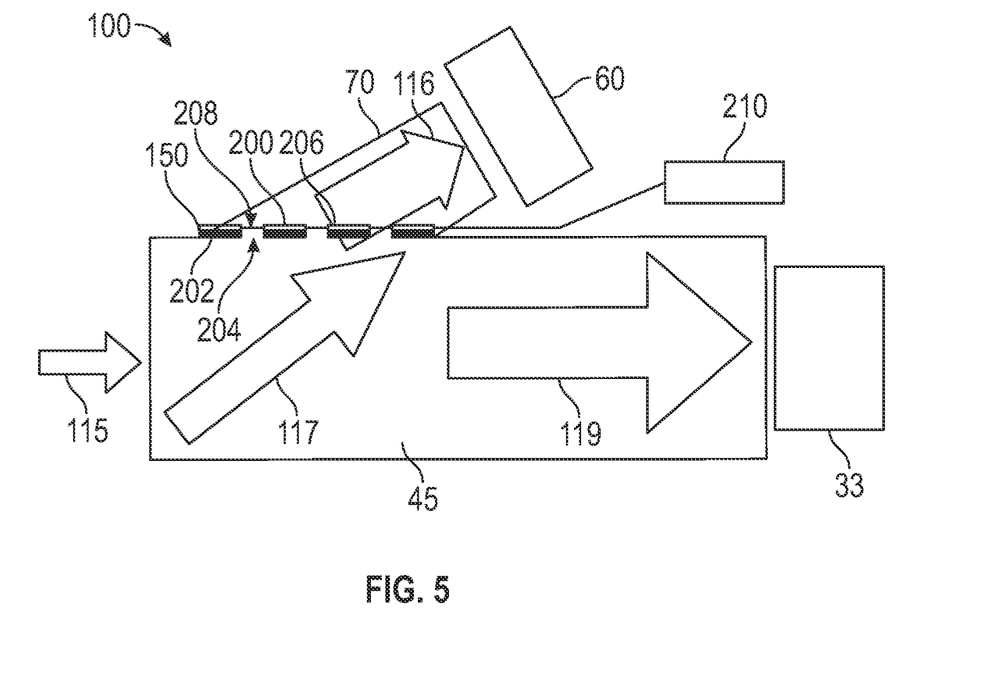
FIG. 5 shows additional aspects of the engine configuration of FIG. 1B, with the baffle at a duct inlet and arranged in an open configuration.
Figure 6:
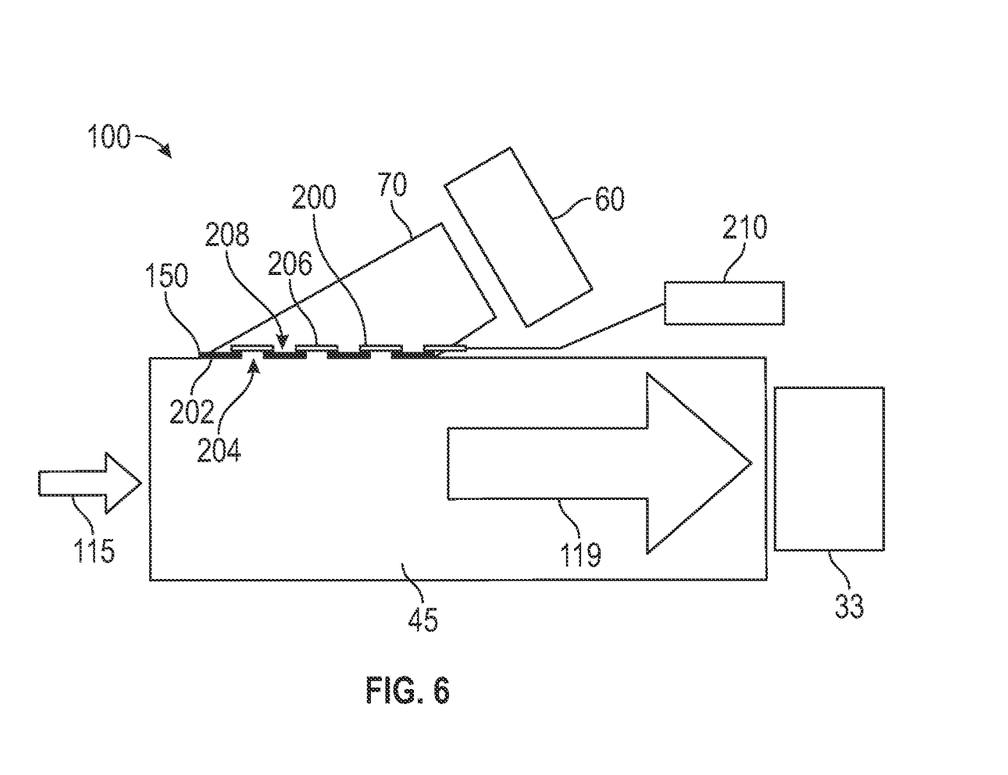
FIG. 6 shows additional aspects of the engine configuration of FIG. 1B, with the baffle at the duct inlet and arranged in a closed configuration.

FIGS. 5 and 6 show additional aspects of the engine configuration FIG. 1B. The cooler 60 and duct 70 are located at the inlet nozzle 45. In these figures, the baffle 200 is located at the duct inlet 150 and controlled by the actuator 210. In FIG. 5, the baffle 200 is opened as the slots 204, 208 in the first and second plates 202, 206 are aligned. A portion 117 of the airflow 115 into the engine 100 is diverted into the duct 70 to provide the induced airflow 116 that cools oil flowing through the cooler 60. In FIG. 6, the baffle 200 is closed, by the actuator 210 moving, e.g., the second plate 206, so that the slots 204, 208 in the first and second plates 202, 206 are out of alignment. The airflow 115 into the engine 100 becomes core flow 119.

Figure 7:
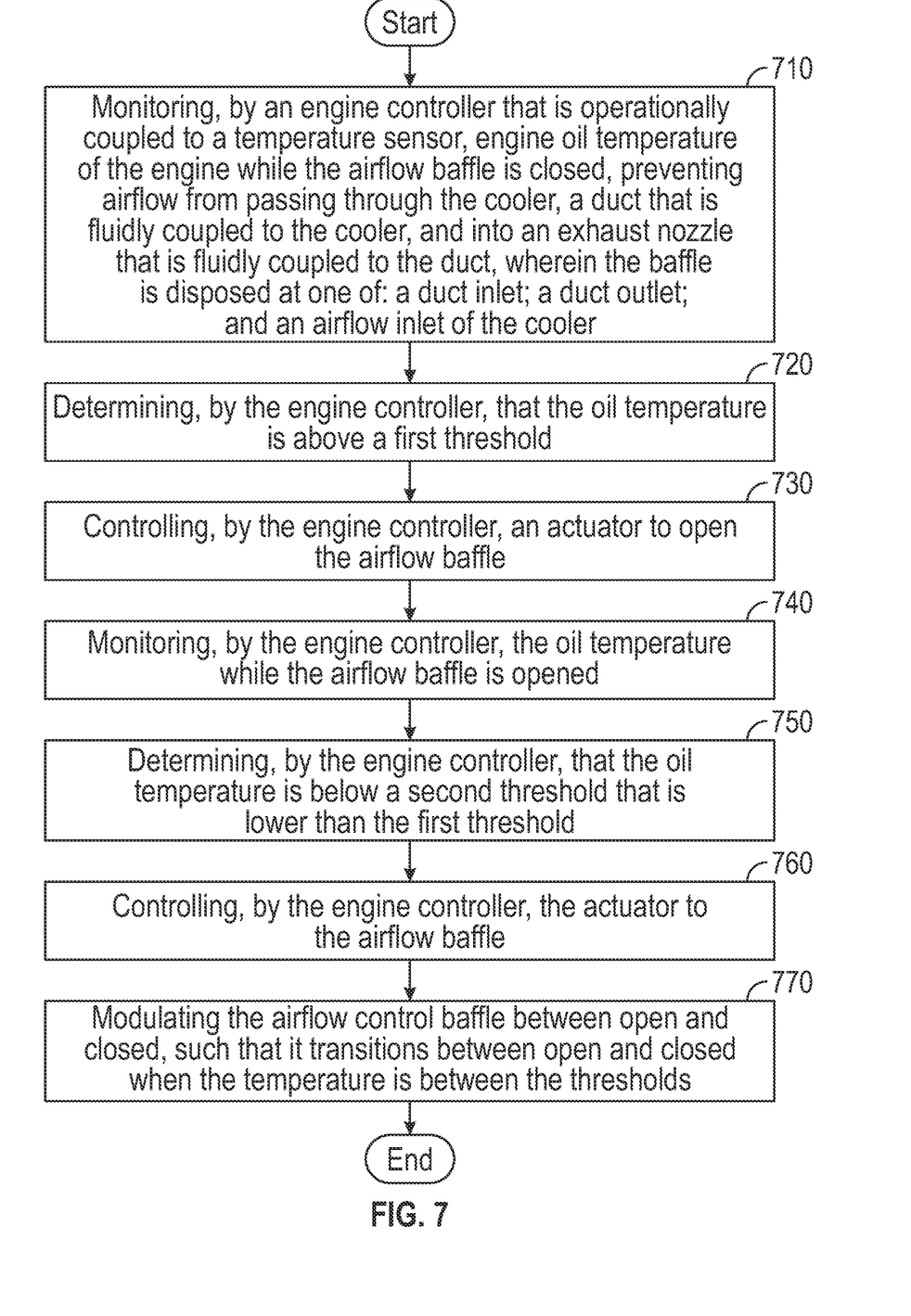
FIG. 7 is a flowchart showing a method of cooling engine oil with the engine configuration of FIG. 1A.

Turning to FIG. 7, a flowchart shows a method of cooling engine oil of the engine 100 having the configuration shown in FIG. 1A. As shown in block 710, the method includes monitoring, by the engine controller 110 that is operationally coupled to the temperature sensor 201, oil temperature of the engine 100 while the airflow control baffle 200 is closed. This configuration prevents airflow 115 from passing through the cooler 60, the duct 70 that is fluidly coupled to the cooler 60, and into the exhaust nozzle 50 that is fluidly coupled to the duct 70. The baffle 200 is disposed at one of the duct inlet 150, the duct outlet 140 and the airflow inlet 190 of the cooler 60. As shown in block 720, the method includes determining, by the engine controller 110, that the oil temperature is above a first threshold. As shown in block 730 the method includes controlling, by the engine controller 110, the actuator 210 to open the baffle 200 and generate the induced airflow 116 that cools the oil flowing through the cooler 60. As shown in block 740 the method includes monitoring, by the engine controller 110, the oil temperature while the baffle 200 is opened. As shown in block 750 the method includes determining, by the engine controller 110, that the oil temperature is below a second threshold that is lower than the first threshold. As shown in block 760, the method includes controlling, by the engine controller 110, the actuator 210 to close the baffle 200. As shown in block 770, the method includes modulating the airflow control baffle 200 between open and closed, such that it transitions between opened and closed when the temperature is between the thresholds.

Figure 8:
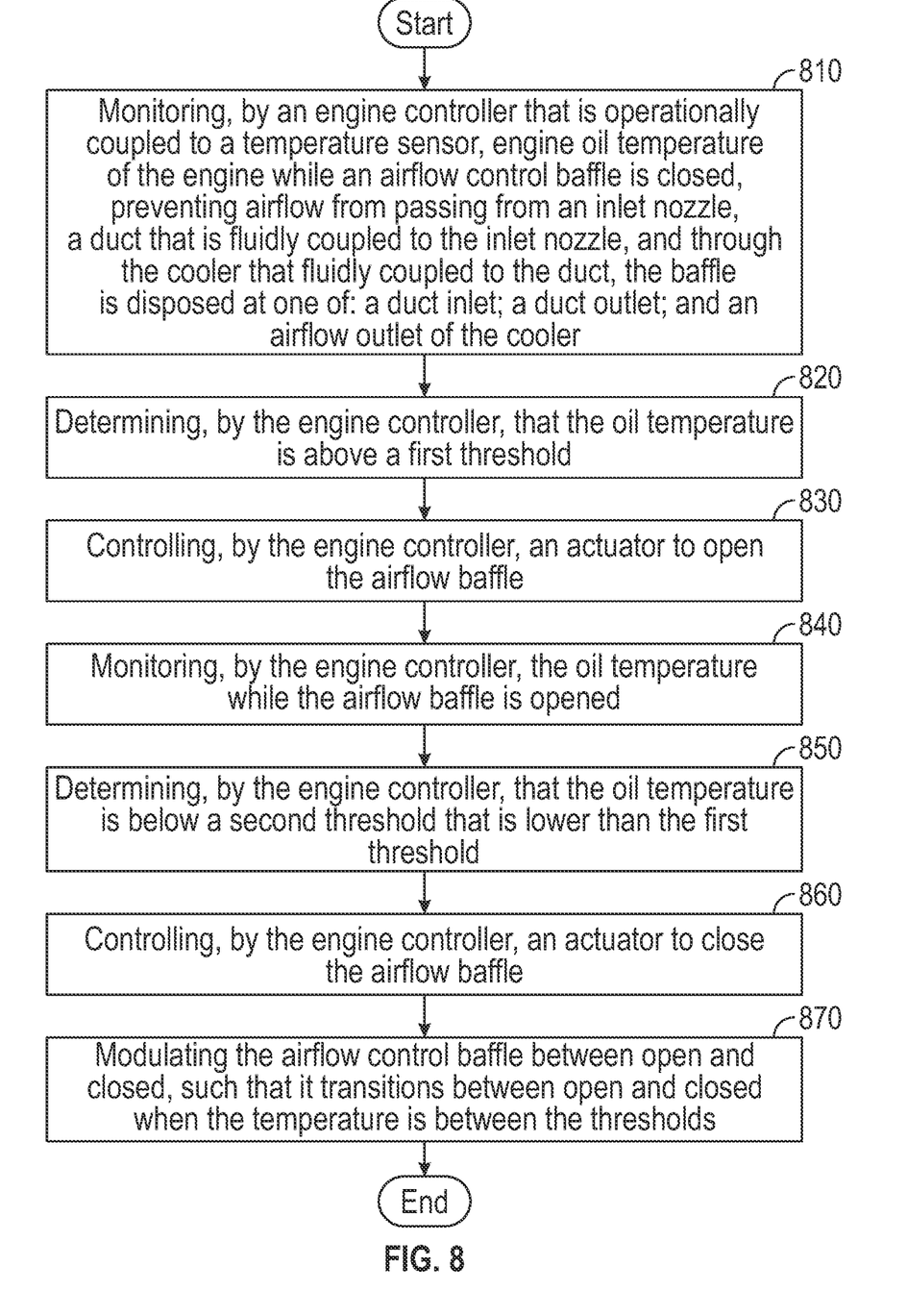
FIG. 8 is a flowchart showing a method of cooling engine oil with the engine configuration of FIG. 1B.

Turning to FIG. 8, a flowchart shows a method of cooling the engine oil of the engine 100 having the configuration shown in FIG. 1B. As shown in block 810, the method includes monitoring, by the engine controller 110 that is operationally coupled to the temperature sensor 201, the oil temperature of the gas turbine engine 100 while the airflow control baffle 200 is closed. This configuration prevents airflow 115 from passing from the inlet nozzle 45, through the duct 70 that is fluidly coupled to the inlet nozzle 45, and through the cooler 60 that is fluidly coupled to the duct 70. The baffle 200 is disposed at one of the duct inlet 150, the duct outlet 140, and the airflow outlet 170 of the cooler 60. As shown in block 820, the method includes determining, by the engine controller 110, that the oil temperature is above a first threshold. As shown in block 830, the method includes controlling, by the engine controller 110, the actuator 210 to open the baffle 200 and generate the induced airflow 116 that cools the oil flowing through the cooler 60. As shown in block 840 the method includes monitoring, by the engine controller 110, the oil temperature while the baffle 200 is opened. As shown in block 850 the method includes determining, by the engine controller 110, that the oil temperature is below the second threshold that is lower than the first threshold. As shown in block 860, the method includes controlling, by the engine controller 110, the actuator 210 to close the baffle 200. As shown in block 870, the method includes modulating the airflow control baffle 200 between open and closed, such that it transitions between opened and closed when the temperature is between the thresholds.

It is to be appreciated that the ability of the system to modulate the baffle positioning and thus airflow through the baffle enables the replacement of isothermal bypass valve that are normally in the oil circuit. For example, if oil is supposed to be kept at 100 degrees Celsius, but it is at 105 degrees Celsius, the baffles can be slightly opened to bring down the temperature. If the oil keeps getting more heat from the engine warming up and the oil temperature does go down, or keeps rising, the baffles can be opened a little more. On the other hand, if the temperature stays reasonably close to the target temperature, the baffles can be kept as they are to prevent wearing out the actuator mechanism.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine, comprising:
    a case;
    a core within the case;
    an exhaust nozzle that is fluidly coupled to the case;
    a duct having a duct outlet that is fluidly coupled to the exhaust nozzle and a duct body extending from the duct outlet to a duct inlet;
    an air/oil cooler having an airflow outlet disposed at the duct inlet and a cooler body extending from the airflow outlet to an airflow inlet; and
    an airflow control baffle disposed at one of:
        the duct inlet;
        the duct outlet; and
        the airflow inlet of the cooler,
        wherein the airflow control baffle is configured to open when oil temperature in the engine is above a first threshold and close when the oil temperature is below a second threshold that is lower than the first threshold.

2. The engine of claim 1, wherein the airflow control baffle is configured to modulate between open and closed, such that it transitions between opened and closed when the temperature is between the thresholds.

3. The engine of claim 1, wherein:
    the airflow control baffle includes a first slotted plate and a second slotted plate configured to slide against the first slotted plate, between: a first position where slots in the first and second slotted plates are aligned with each other to open the airflow control baffle; and a second position where the slots in the first and second slotted plates are offset from each other to close the airflow control baffle.

4. The engine of claim 3, comprising:
    an engine controller;
    a temperature sensor in the engine that is operationally coupled to the engine controller; and
    an actuator that is operationally coupled to the engine controller and the second slotted plate of the airflow control baffle, and is configured to move the second slotted plate to open or close the airflow control baffle when the oil temperature in the engine is sensed by the temperature sensor as being above the first threshold and close when the oil temperature is sensed by the temperature sensor as being is below the second threshold that is lower than the first threshold.

5. The engine of claim 1, wherein airflow baffle is along an airflow path providing airflow to the cooler.

6. The engine of claim 1, wherein the airflow control baffle is disposed at the duct inlet or outlet.

7. The engine of claim 1, wherein the airflow control baffle is disposed at the airflow inlet of the cooler.

8. The engine of claim 1, comprising:
    an inlet nozzle that is fluidly coupled to the case.

9. A gas turbine engine, comprising:
    a case;
    a core within the case;
    an inlet nozzle that is fluidly coupled to the case;
    a duct having a duct inlet that is fluidly coupled to the inlet nozzle and a duct body extending from the duct inlet to a duct outlet;
    an air/oil cooler having an airflow inlet disposed at the duct outlet and a cooler body extending from the airflow inlet to an airflow outlet; and
    an airflow control baffle disposed at one of:
        the duct inlet;
        the duct outlet; and
        the airflow outlet of the cooler,
        wherein the airflow control baffle is configured to open when oil temperature in the engine is above a first threshold and close when the oil temperature is below a second threshold that is lower than the first threshold.

10. The engine of claim 9, wherein the airflow control baffle is configured to modulate between open and closed, such that it transitions between opened and closed when the temperature is between the thresholds.

11. The engine of claim 9, wherein:
    the airflow control baffle includes a first slotted plate and a second slotted plate configured to slide against the first slotted plate between: a first position where slots in the first and second slotted plates are aligned with each other to open the airflow control baffle; and a second position where the slots in the first and second slotted plates are offset from each other to close the airflow control baffle.

12. The engine of claim 11, comprising:
an engine controller;
a temperature sensor in the engine that is operationally coupled to the engine controller;
an actuator that is operationally coupled to the engine controller and the second slotted plate of the airflow control baffle and is configured to move the second slotted plate to open or close the airflow control baffle when the oil temperature in the engine is sensed by the temperature sensor as being above the first threshold and close when the oil temperature is sensed by the temperature sensor as being is below the second threshold that is lower than the first threshold.

13. The engine of claim 9, wherein airflow baffle is along an airflow path providing airflow to the cooler.

14. The engine of claim 9, wherein the airflow control baffle is disposed at the duct inlet or outlet.

15. The engine of claim 9, wherein the airflow control baffle is disposed at the airflow outlet of the cooler.

16. The engine of claim 9, comprising:
an exhaust nozzle that is fluidly coupled to the case.

17. A method of cooling engine oil in gas turbine engine, comprising:
monitoring, by an engine controller that is operationally coupled to a temperature sensor, oil temperature of the gas turbine engine while an airflow control baffle is closed, preventing airflow from passing through an air/oil cooler, a duct that is fluidly coupled to the cooler, and into an exhaust nozzle that is fluidly coupled to the duct, wherein the airflow control baffle is disposed at one of: a duct inlet; a duct outlet; and an airflow inlet of the cooler;
determining, by the engine controller, that the oil temperature is above a first threshold; and
controlling, by the engine controller, an actuator to open the airflow control baffle;
monitoring, by the engine controller, the oil temperature in the engine while the airflow control baffle is opened;
determining, by the engine controller, that the oil temperature is below a second threshold that is lower than the first threshold; and
controlling, by the engine controller, the actuator to close the airflow control baffle.

18. The method of claim 17, including modulating the airflow control baffle between open and closed, such that it transitions between opened and closed when the temperature is between the thresholds.

19. A method of cooling engine oil in gas turbine engine, comprising:
monitoring, by an engine controller that is operationally coupled to a temperature sensor, oil temperature in the gas turbine engine while an airflow control baffle is closed, preventing airflow from passing from an inlet nozzle, through a duct that is fluidly coupled to the inlet nozzle, and through the cooler that is fluidly coupled to the duct, wherein the airflow control baffle is disposed at one of: a duct inlet; a duct outlet; and an airflow outlet of the cooler;
determining, by the engine controller, that the oil temperature is above a first threshold; and
controlling, by the engine controller, an actuator to open the airflow control baffle;
monitoring, by the engine controller, the oil temperature in the engine while the airflow control baffle is opened;
determining, by the engine controller, that the oil temperature is below a second threshold that is lower than the first threshold; and
controlling, by the engine controller, the actuator to close the airflow control baffle.

20. The method of claim 19, including modulating the airflow control baffle between open and closed, such that it transitions between opened and closed when the temperature is between the thresholds.

* * * * *